United States Patent [19]
Walcott

[11] 3,890,934
[45] June 24, 1975

[54] WATER COLLECTION AND STORAGE DISPERSION APPARATUS

[76] Inventor: Frank R. Walcott, 1212 N. Ontario St., Burbank, Calif. 91505

[22] Filed: July 16, 1973

[21] Appl. No.: 379,553

[52] U.S. Cl. .................................................. 119/78
[51] Int. Cl............................................. A01k 7/02
[58] Field of Search ............. 119/72, 74, 78, 79, 80; 137/236

[56] References Cited
UNITED STATES PATENTS

| | | | |
|---|---|---|---|
| 390,780 | 10/1888 | Heaton | 119/74 |
| 1,162,539 | 11/1915 | Zimmerman | 119/78 |
| 1,560,088 | 11/1925 | Marquardt | 119/78 |
| 3,559,408 | 2/1971 | Earnhart | 119/74 X |

Primary Examiner—Hugh R. Chamblee
Attorney, Agent, or Firm—Roger A. Marrs

[57] ABSTRACT

A modular collection and storage apparatus is disclosed herein for gathering rainfall and dispensing collected rainfall for animal wildlife. The apparatus includes an elongated storage tank having a central depression into which a plurality of ducts discharge water. The tank and ducts are composed of panels arranged with respect to each other to provide a path for rainfall water to follow while the tank includes slotted rails for insertably receiving the edges of panels for constructing an enclosure for storage water gather via the panelled ducts. A gravity feed dispensing unit is remotely connected to the storage tank by a flexible hose provided with a conventional float valve mechanism. The dispensing unit includes an opening exposing a quantity of the storage water for wildlife drinking purposes.

5 Claims, 7 Drawing Figures

PATENTED JUN 24 1975 3,890,934
SHEET 1
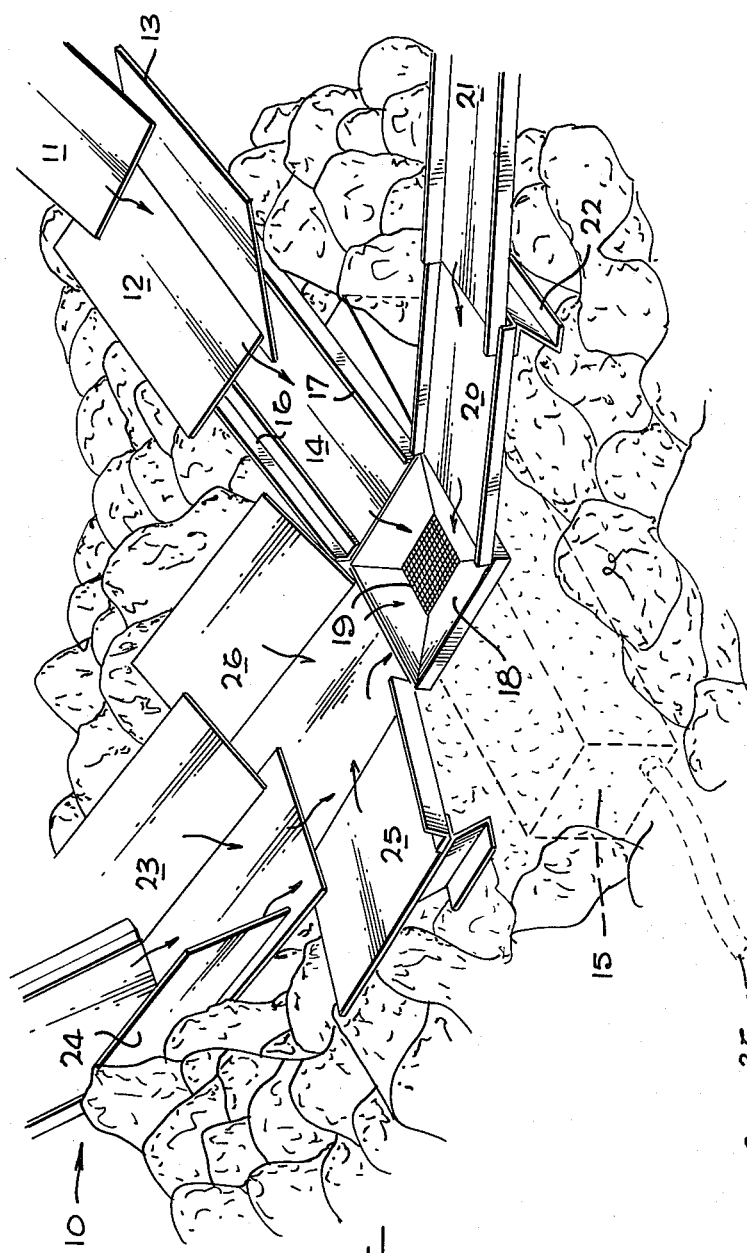
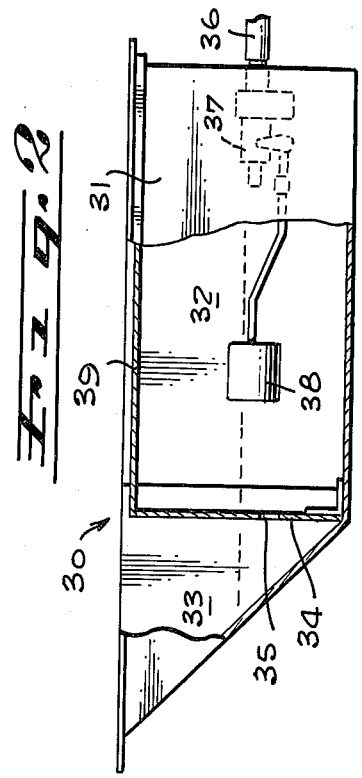
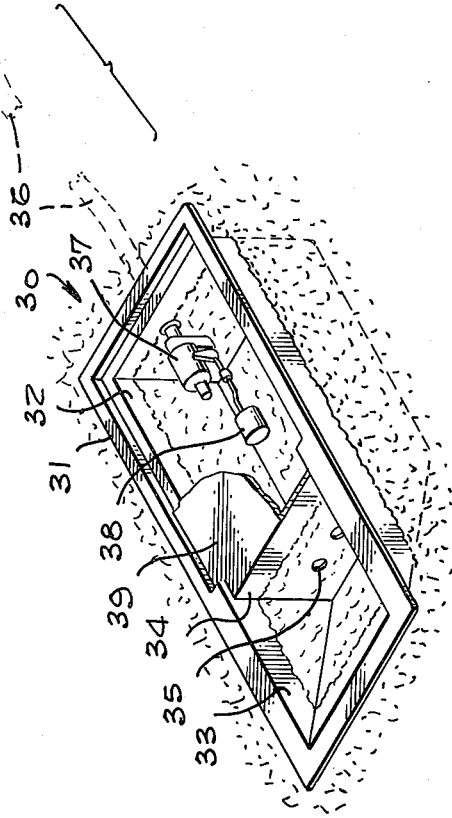

PATENTED JUN 24 1975 SHEET 2 3,890,934
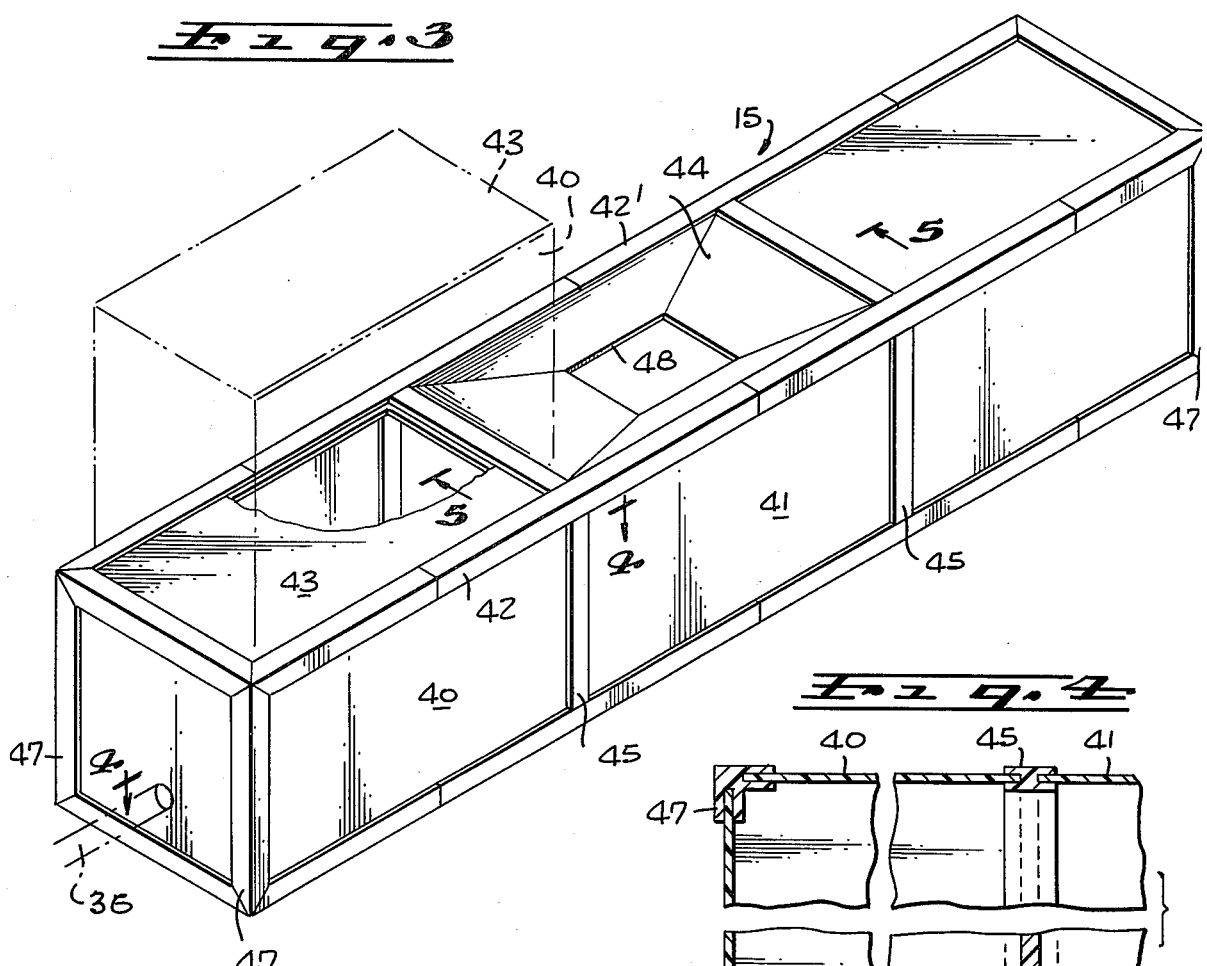
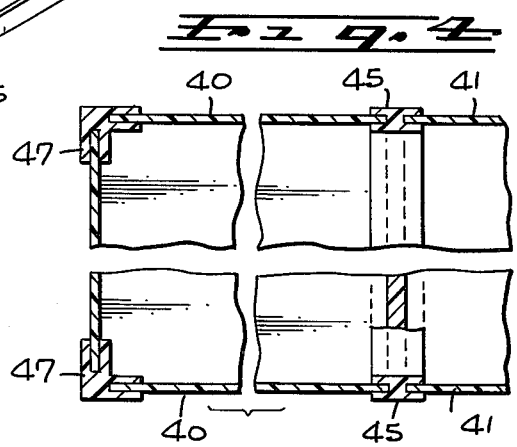
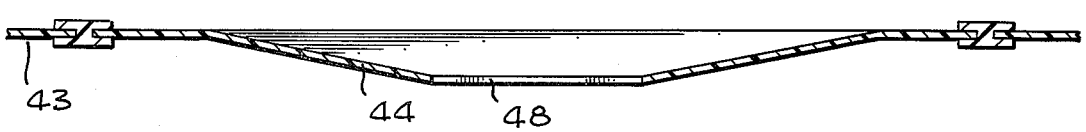
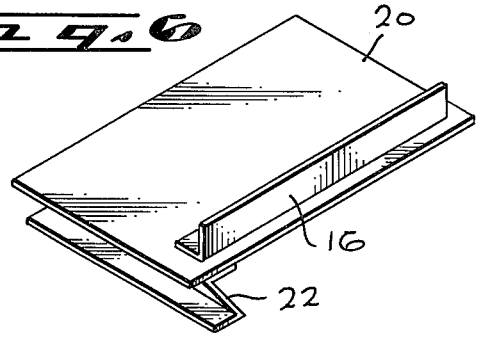
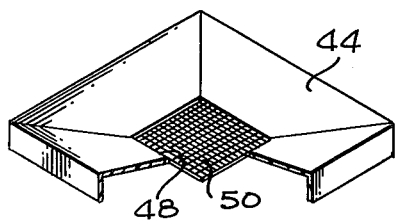

3,890,934

WATER COLLECTION AND STORAGE DISPERSION APPARATUS

BACKGROUND OF THE INVENTION

1. Field of the Invention

This invention relates to rainwater collection, storage and dispensing systems and more particularly to a novel such system having modular construction for installation in remote wilderness areas.

2. Description of the Prior Art

It has been a conventional practice for wildlife animals to drink at ponds and other water collection areas that are natural and which are devoid of man-made implements. However, in times of drought or relatively short rainfall seasons, insufficient sources of water greatly restrict the historic habitat of wild animals such as big-horn sheep and related wildlife.

Therefore, a long standing need has prevailed for providing a modular apparatus capable of being carried in section to a remote wilderness area where these sections may be installed so as to provide a collection means, a storage means and a water dispensing means. Preferably, such a device or apparatus should encompass the installation in the most rugged terrain, under extreme temperature changes, and a capacity adjustment to the amount of annual rainfall in the area. Preferably, the apparatus is oriented to cooperate with natural water sheds and run-offs along with consideration for gulley-wash type storms.

A further consideration is to adapt installation of the device to fit the natural environment so as to preserve the historic habitat of the wildlife and should consider the effect of predatory enemies.

SUMMARY OF THE INVENTION

Accordingly, the above problems and difficulties have been obviated by the present invention which provides a novel water collection, storage and dispensing apparatus that may be transported to remote wilderness areas for assembly and usage. The apparatus includes a collection means comprising a plurality of panels forming ducts leading to a storage means consisting of an elongated tank having a central opening for receiving collected water from the collecting means. A dispensing means is remotely located from the storage means and is connected thereto by a flexible hose. The dispensing means includes a float valve for gravity feeding water from the storage means to the dispensing means for relatively immediate use. The dispensing means further includes an opening presenting available water for use by the wildlife.

A feature of the present invention provides that a substantial quantity of water may be stored in the storage tank while only a portion of the water is available for drinking via the dispensing means. In this manner, an adjustment means is provided whereby the storage means constitutes a major storage of water during times of limited rainfall.

Therefore, it is among the primary objects of the present invention to provide a novel water collection and storage dispersion system that is modular in construction whereby the modules may be transported to remote areas for installation and usage.

Another object of the present invention is to provide a novel water collection and storage dispersion system incorporating modular components wherein the components may be assembled in remote wildlife areas taking advantage of natural environment and wildlife habits.

Still another object of the present invention is to provide a plurality of modular components capable of being transported to remote wilderness areas including a rainfall collection means, a storage means and a dispensing means whereby the rainfall collected is stored for future on demand use by wildlife.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is a perspective view of the novel water collection and storage dispersion apparatus of the present invention;

FIG. 2 is a side elevational view, partly in section, of the water dispensing means employed in the apparatus of FIG. 1;

FIG. 3 is a perspective view of the water storage means incorporated in the apparatus of FIG. 1;

FIG. 4 is a transverse sectional view of the storage means shown in FIG. 3 and taken in the direction of arrows 4—4 thereof;

FIG. 5 is an enlarged sectional view taken in the direction of arrows 5-5 of FIG. 3 illustrating the central water collection opening leading into the storage tank;

FIG. 6 is a perspective view of a portion of the collection means shown in FIG. 1; and FIG. 7 is a perspective view of the entrance to the storage means tanks shown in FIG. 3.

DESCRIPTION OF THE PREFERRED EMBODIMENT

Referring now to FIG. 1, the novel apparatus of the present invention is shown in the general direction of arrow 10 which is illustrated as having been installed in a natural wilderness area such as a natural dry stream or the like. The apparatus is surrounded by a plurality of rocks, bushes, trees and the like so that the natural area is disturbed as little as possible. The apparatus includes, in general, a collection means, a bulk storage means and a dispensing means.

Continuing with FIG. 1, the collection or gathering means includes a plurality of panels such as is indicated by numerals 11, 12 and 13 that are placed in close proximity to each other so as to provide a conduit or water bed for conducting the flow of rainfall along a given path. The adjacent edges of the panels are intentionally overlapped so that the water will flow in the desired direction. The panels are supported on adjacent rocks and, preferably, the panels are additionally supported on a runner 14 that completes the path of the water to a storage means 15. It is to be particularly noted that the runner 14 includes a pair of parallel side fences or curbs indicated by numerals 16 and 17, respectively. The end of runner 14 is located adjacent a central opening in the storage means which is fitted with a depressed entrance indicated by numeral 18 which includes a screen 19 that leads into the interior of the storage means 15.

Other conduit means are included in the gathering means other than the disposition of panels shown by numerals 11–14, respectively. For example, a pair of runners 20 and 21 with their side curbs or fences may be placed together for collecting and directing rainfall to the entrance 18. In this instance, the runners include over-lapping adjacent ends and are supported by a Z stand-off member indicated by numeral 22.

Another collection means including a plurality of panels is illustrated with respect to panels 23, 24, 25 and 26 that are disposed or located on the opposite side of tank 15. These panels are arranged in juxtaposition to accommodate a different terrain. These panels are layed or placed adjacent one another so that their edge marginal regions over-lap to provide a conduit for conducting rain water to the tank 15. These edge marginal regions may be secured to each other in any suitable manner such as adhesive or bonding.

Referring further to FIG. 1, it can be seen that the tank 15 for storing water collected via the gathering system or collecting ducts is coupled to a dispensing means indicated in the direction of arrow 30 that comprises a container 31 divided into a storage section 32 and a dispensing section 33 by means of a partition 34 having holes or apertures 35 interconnecting the chambers 32 and 33 in fluid communication. The dispensing means 30 is coupled to the storage means via a flexible hose or conduit 36 so that the dispensing unit may be remotely located in a more camouflaged area then the collecting means and the storage means can be located.

The intermediate storage chamber 32 includes a conventional float valve 37 that is operably connected to a float 38 so that water is introduced to intermediate storage chamber 32 on demand from the storage means 15 by the float valve 37. The intermediate chamber is covered by a lid 38 while the dispensing chamber 33 is open for access to the animals and wildlife for drinking purposes. Preferably, the dispensing unit 30 is somewhat buried in the ground so that only the dispensing chamber 33 is readily visable.

Referring now in detail to FIG. 2, it can be seen that as the water level in the intermediate storage chamber 32 is depleted, the float valve 38 will extend downwardly whereby the lever arm will open valve 37 to permit a refill of the intermediate chamber 32 to occur via hose 36 from the storage means 15. Preferably, the float valve should be set so that water will be at a level above the opening 35 intercommunicating chambers 32 and 33.

Referring now in detail to FIG. 3, the storage means 15 is illustrated as an elongated storage tank composed of a plurality of flat panels characterized by panels 40 and 41 wherein the adjacent ends of top, side, end and bottom panels are joined together by a plurality of rails. Rails 42 and 43 are illustrative of rails joining adjacent edges of side panels 40 and 41 and top panels 43 and entrance top panel 44. As illustrated in broken lines, the panels are substantially rectangular and flat so that they may be readily carried by pack animals, small trucks or other carrier vehicles.

As shown in FIG. 4, the panels have their edge marginal regions inserted into slots carried in the rails. Side rails 45 are typical of the side rails which hold the panelled walls such as walls 40 and 41 together. In FIG. 4, it can be seen that the side rails 45 as well as the corner rails 47 include elongated slots into which the edge marginal regions of the respective panels are insertably received and retained. Preferably, retention is achieved by employing a suitable adhesive or bonding agent so that individual fasteners are not required. Furthermore, it is contemplated that plastic or plastic like materials such as fiber glass be employed for construction of the apparatus whereby the panels and other components provide a high strength-to-weight ratio.

Referring now to FIG. 5 in detail, the entrance 44 leading into the storage tank 15 is illustrated which shows that a special panel is provided having a depression terminating in an opening indicated by numeral 48. Preferably, a screen or other filtering means is provided at the opening so that only clear water is permitted to enter the tank.

FIG. 7 illustrates the employment of a screen 50 in connection with filtering the entrance leading into the tank 15. Also, it is noted that panel forming entrance 44 provides a recess wherein water supplied from the gathering or ducting means flows through the screen or filter 50 into the tank.

Referring now to FIG. 6, it can be seen that the gathering means may include panel 20 having rail or fence 16 adhesively secured along the edge marginal region of the panel so as to prevent water from flowing over the sides thereof. Panel 20 is supported on the ground or rock bed by means of the Z shaped stand-off 22.

In view of the foregoing, it can be seen that the water collection and storage dispersion system of the present invention provides a gathering means for collecting rainfall and conducting the rainfall to a storage means for bulk holding purposes. The invention further includes a dispensing means remotely located from the storage means and connected thereto by an adjustment means for selectively withdrawing water from the storage means for immediate drinking purposes. In this manner, water is available for wildlife use even in times of prolonged drought since sufficient water is held in the storage tank 15 to last until the next rainfall.

The apparatus is modular in construction so that the panels, rails, and other components thereof may be readily transported into wilderness areas by pack mule or horse and wherein the components may be installed or assembled together in a relatively short period of time without the use of specialized tools or specialized knowledge.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a water collection and storage dispersion apparatus for use in a natural wildlife environment, the combination comprising:
   a water storage means;
   a rainfall water collecting means diverging with respect to said storage means for conducting a flow of rainfall water to said storage means for holding and storage purposes;
   water dispensing means remotely connected to said storage means via a flexible hose for supplying a quantity of water from said storage means to said dispensing means for immediate use by wildlife;
   valve means operably connected to said hose for regulating the flow of water from said storage means to said dispensing means whereby the level of water in said dispensing means is maintained at a predetermined level;

said collecting means comprises a plurality of panels arranged with overlapping edge marginal regions so as to define an open-topped water conducting path in the form of a trough leading to said storage means;

said storage means comprises an elongated tank composed of wall panels secured together by interlocking ribs;

said storage means further includes a central panel having a recessed entrance leading to the interior of said tank and said collecting means terminating at said tank entrance for delivering collected water thereto; and said dispensing means includes an enclosure having an enclosed immediate storage chamber and an open drinking chamber with fluid conducting means interconnecting said chambers.

2. The invention as defined in claim 1 wherein:
said fluid conducting means comprises a partition separating said chambers and having a pair of openings therein.

3. The invention as defined in claim 2 wherein:
said valve means comprises a float valve carried on one end of said hose within said immediate chamber.

4. The invention as defined in claim 3 wherein:
said apparatus includes modular construction of said collecting means and said storage means employing materials having a high strength-to-weight ratio.

5. The invention as defined in claim 4 including:
a plurality of stand-offs for supporting individual panels of said collecting means.

* * * * *